(12) United States Patent
Kawashima et al.

(10) Patent No.: US 7,002,339 B2
(45) Date of Patent: Feb. 21, 2006

(54) ROTATION ANGLE DETECTING DEVICE

(75) Inventors: Takashi Kawashima, Nagoya (JP); Kenji Takeda, Okazaki (JP)

(73) Assignees: Denso Corporation, Kariya (JP); Nippon Soken, Inc., Nishio (JP)

( * ) Notice: Subject to any disclaimer, the term of this patent is extended or adjusted under 35 U.S.C. 154(b) by 0 days.

(21) Appl. No.: 11/139,658

(22) Filed: May 31, 2005

(65) Prior Publication Data

US 2005/0264282 A1    Dec. 1, 2005

(30) Foreign Application Priority Data

May 31, 2004   (JP)   ............................. 2004-162249

(51) Int. Cl.
*G01B 7/30* (2006.01)
(52) U.S. Cl. .................. 324/207.25; 324/244
(58) Field of Classification Search ............... None
See application file for complete search history.

(56) References Cited

U.S. PATENT DOCUMENTS

| | | | | |
|---|---|---|---|---|
| 5,889,400 | A | * | 3/1999 | Nakazawa ............... 324/207.2 |
| 6,489,761 | B1 | * | 12/2002 | Schroeder et al. ...... 324/207.25 |
| 6,545,462 | B1 | | 4/2003 | Schott et al. ............ 324/207.2 |
| 6,576,890 | B1 | * | 6/2003 | Lin et al. ................ 250/231.14 |
| 2004/0194560 | A1 | * | 10/2004 | Froehlich et al. ....... 73/862.333 |
| 2005/0104581 | A1 | * | 5/2005 | Miyata et al. ......... 324/207.25 |

FOREIGN PATENT DOCUMENTS

| | | |
|---|---|---|
| JP | 2003-75108 | 3/2003 |
| JP | 2003-324930 | 11/2003 |

* cited by examiner

*Primary Examiner*—Bot LeDynh
(74) *Attorney, Agent, or Firm*—Nixon & Vanderhye P.C.

(57) ABSTRACT

A rotation angle detecting device includes a magnet, a magnetic flux concentrator, a first magnetic sensor, and a second magnetic sensor. The magnet is provided in a rotary member and is substantially coaxially aligned with a rotational axis thereof. The magnet has a magnetic flux generation section and a magnetic flux absorption section oriented in radial directions vertical to the rotational axis. The magnetic flux concentrator is made of a magnetic material and rotates integrally with the magnet. The magnetic flux concentrator is substantially coaxially aligned with the rotational axis and disposed substantially parallel to the magnet. The first and second magnetic sensors are disposed between the magnet and the magnetic flux concentrator at a predetermined angle away from each other in a rotational direction. The rotation angle detecting device detects the rotation angle of the rotary member based on magnetic flux passing through the first and second magnetic sensors.

5 Claims, 10 Drawing Sheets

FIG. 10

ROTATION ANGLE DETECTING DEVICE

CROSS REFERENCE TO RELATED APPLICATIONS

This application is based upon and claims the benefit of priority of Japanese Patent Application No. 2004-162249, filed on May 31, 2004, the contents of which are incorporated herein by reference.

FIELD OF THE INVENTION

The present invention relates to a rotation angle detecting device which detects the rotation angle of a rotary member without contact.

BACKGROUND OF THE INVENTION

Figure 7A:
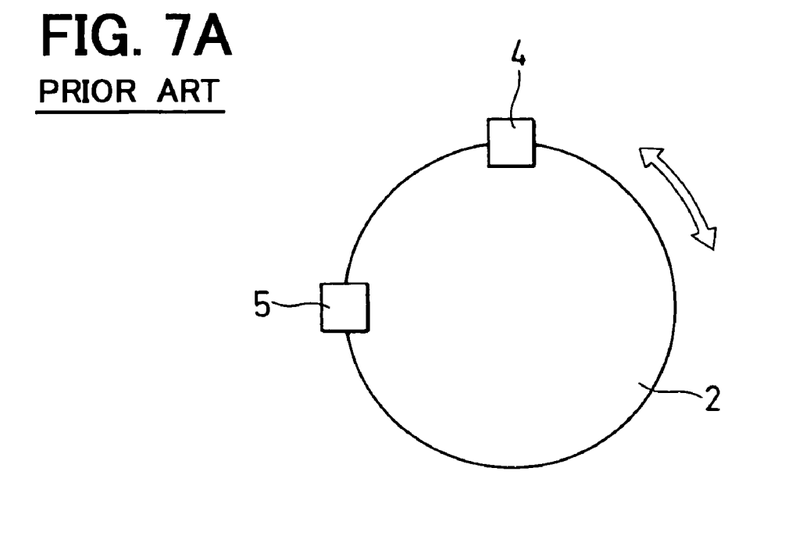
FIG. 7A is a bottom view of a first example of a conventional rotation angle detecting device.
Figure 7B:
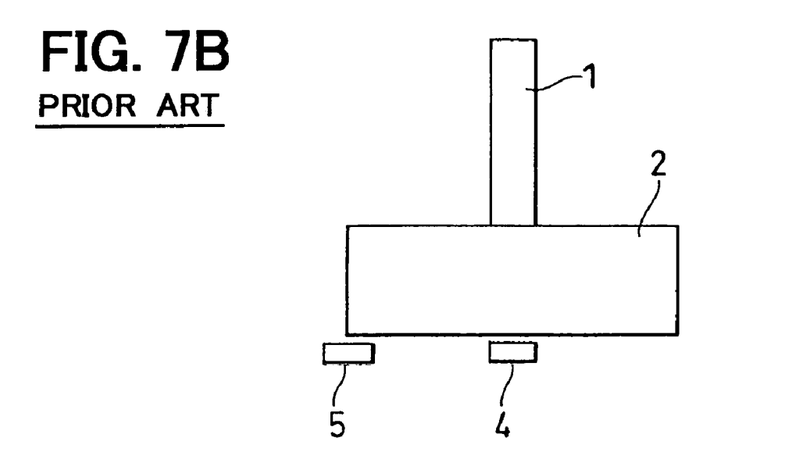
FIG. 7B is a side view of the conventional rotation angle detecting device of FIG. 7A.

A technology shown in FIG. 7 is known as a rotation angle detecting device which detects a wide range of rotation angles by use of a magnet and a magnetic sensor.

This rotation angle detecting device comprises a magnet 2 formed in the shape of a disc, a first magnetic sensor 4, and a second magnetic sensor 5. The center of the peripheral circle of the magnet 2 is coaxial with a rotational axis. In the magnet 2, a magnetic flux generation section is oriented in one of radial directions vertical to the rotational axis, and a magnetic flux absorption section is oriented in the other radial direction. The first magnetic sensor 4 which is disposed in the bottom face of the outer edge of the magnet 2 generates an output in accordance with magnetic flux radiated from the magnet 2. The second magnetic sensor 5 is disposed in the bottom face of the outer edge of the magnet 2 so as to be positioned at 90 degrees with respect to the first magnetic sensor 4 in a rotational direction. The second magnetic sensor 5 generates an output in accordance with magnetic flux radiated from the magnet 2.

When the rotational axis 1 rotates, the first and second magnetic sensors 4 and 5 generate sine waveforms with a phase difference of 90 degrees. In other words, when one output is in a sine curve, the other output is in a cosine curve.

By carrying out angle calculation with the two outputs, it is possible to detect the rotation angle of a rotary member over 360 degrees (refer to, for example, Japanese Patent Laid-Open Publication No. 2003-75108).

In the rotation angle detecting device according to the conventional example 1, the first and second magnetic sensors 4 and 5 are disposed in the vicinity of the periphery of the magnet 2. In the rotation angle detecting device, however, lines of magnetic flux generated by the magnet 2 are not uniform in a certain direction, and the lines of magnetic flux are oriented from the outer edge of the magnet 2 to the radial direction. Thus, when there is a slight misalignment (assembly error) between the first and second magnetic sensors 4 and 5, the vector components of magnetic flux applied to the magnetically sensitive surfaces of the first and second magnetic sensors 4 and 5 vary, so that the outputs of the first and second magnetic sensors 4 and 5 vary. Accordingly, precision in the detection of an angle becomes worse.

Figure 8:
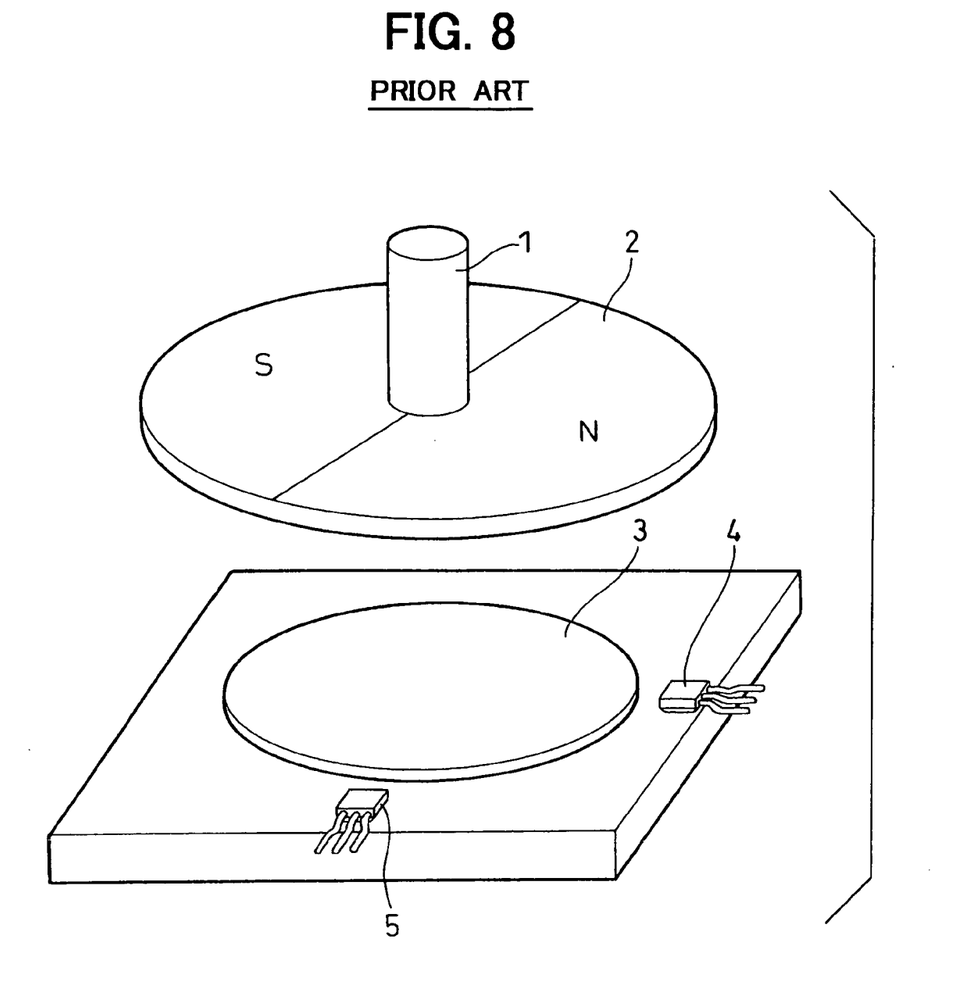
FIG. 8 is an exploded perspective view of a second example of a conventional rotation angle detecting device.

A rotation angle detecting device shown in FIG. 8 is known as a technology for preventing the foregoing problem.

In the rotation angle detecting device, a magnetic flux concentrator 3 made of a magnetic material is disposed in the vicinity of first and second magnetic sensors 4 and 5. The magnetic flux concentrator 3 regulates lines of magnetic flux applied from a magnet 2 to the first and second magnetic sensors 4 and 5, so that the vector components of magnetic flux applied to the magnetically sensitive surfaces of the first and second magnetic sensors 4 and 5 are prevented from varying (refer to, for example, Japanese Patent Laid-Open Publication No. 2002-71381).

Figure 9A:
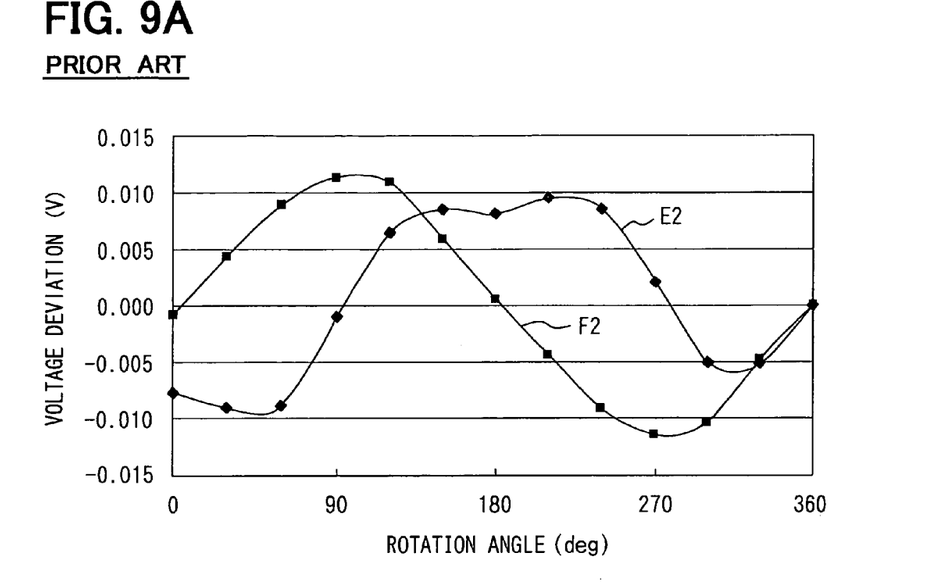
FIG. 9A is a graph of deviation amounts in the output voltage of first and second magnetic sensors in the first half and the latter half of rotation of the conventional rotation angle detecting device of FIG. 8.
Figure 9B:
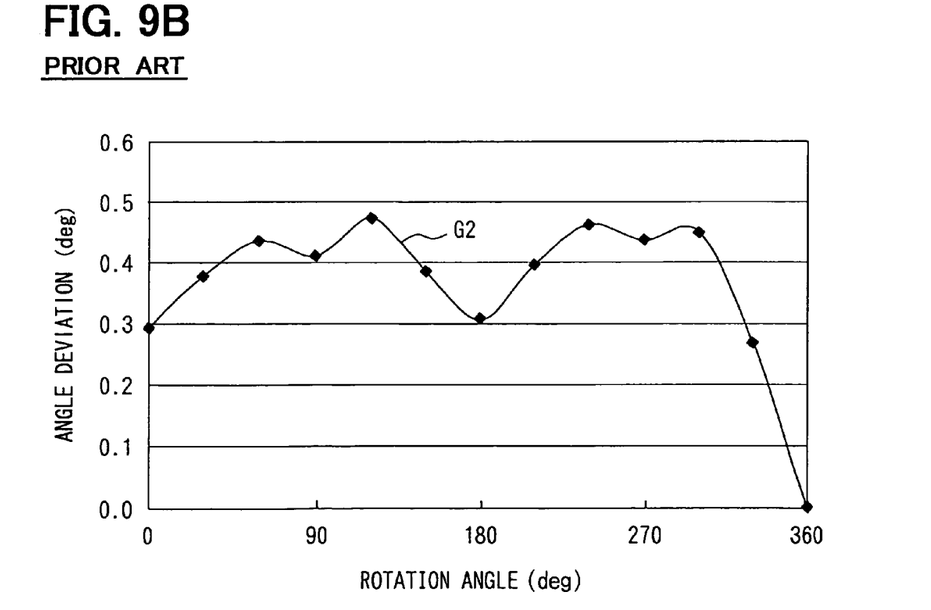
FIG. 9B is a graph of a deviation amount in a detected angle of the conventional rotation angle detecting device of FIG. 8.

In the rotation angle detecting device according to the conventional example 2, however, both of the first and second magnetic sensors 4 and 5 are fixed on a fixed member. A residual magnetic force on the magnetic flux concentrator 3 varies between the first and latter halves of the rotation (the forward rotation and the reverse rotation) of the magnet 2, and hence hysteresis occurs in the output characteristics of the first and second magnetic sensors 4 and 5. Thus, as shown in a solid line E2 (an output deviation amount in the first and latter halves of the first magnetic sensor 4) and a solid line F2 (an output deviation amount in the first and latter halves of the second magnetic sensor 5), the voltage outputs of the first and second magnetic sensors 4 and 5 largely differ between the first and latter halves of the rotation. When the voltage outputs of the first and second magnetic sensors 4 and 5 differ between the first and latter halves of the rotation, as described above, a deviation amount in a detection angle becomes large as shown by a solid line G2 (a deviation amount in a rotation angle) in FIG. 9B.

Namely, in the rotation angle detecting device according to the conventional example 2, the hysteresis makes precision in the detection of an angle worse.

SUMMARY OF THE INVENTION

Considering the foregoing problems, an object of the present invention is to provide a rotation angle detecting device in which precision in the detection of an angle is prevented from deteriorating even when there is a slight misalignment (assembly error) between first and second magnetic sensors, and hysteresis does not occur in the output characteristics of the first and second magnetic sensors.

In one aspect of the present invention, a rotation angle detecting device includes a magnetic flux concentrator disposed in parallel with a magnet, and first and second magnetic sensors disposed between the peripheral circle of the magnet and the peripheral circle of the magnetic flux concentrator. Thus, the magnetic flux concentrator regulates lines of magnetic flux applied from the magnet to the first and second magnetic sensors. Therefore, if there is a slight misalignment (assembly error) in the first and second magnetic sensors, the vector components of magnetic flux applied to the magnetically sensitive surfaces of the first and second magnetic sensors are prevented from varying. In other words, if there is an assembly error in the first and second magnetic sensors, it is possible to prevent precision in the detection of an angle from deteriorating.

Since the magnet and the magnetic flux concentrator integrally rotate, hysteresis does not occur in the output characteristics of the first and second magnetic sensors in the first and latter halves of the rotation (the forward rotation and the reverse rotation) of the magnet. Therefore, it is possible to eliminate deterioration in precision in the detection of an angle due to hysteresis.

As described above, if there is an assembly error in the first and second magnetic sensors, precision in the detection of an angle is prevented from deteriorating, and deterioration in precision in the detection of an angle due to hysteresis does not occur. Therefore, it is possible to provide a rotation angle detecting device with high precision in the detection of an angle.

In another aspect of the present invention, a rotation angle detecting device includes a starting point at a radial outer end of the magnet and an axial end of the magnet on the side of the magnetic flux concentrator. When 0 degree refers to the direction of the rotational axis heading for the magnetic flux concentrator from the starting point, and 90 degrees refer to a radial direction heading for the inside of the magnet from the starting point, the peripheral circle of the magnetic flux concentrator is disposed in a position of approximately 45 degrees with respect to the starting point. The first and second magnetic sensors are also disposed in positions of approximately 45 degrees with respect to the starting point.

As described above, the lines of magnetic flux generated between the outer edge of the magnet and the outer edge of the magnetic flux concentrator form an angle of approximately 45 degrees, and the first and second magnetic sensors are disposed in the positions of approximately 45 degrees with respect to the starting point. Thus, it is possible to select one direction to which each of the magnetically sensitive surfaces of the first and second magnetic sensors is oriented from among the axial directions of the rotational axis and the radial directions of the rotational axis. Therefore, when the first and second magnetic sensors are limited in terms of installability, it is possible to select the installation orientation of the first and second magnetic sensors, and hence the installability of the first and second magnetic sensors is increased.

In still another aspect of the present invention, a rotation angle detecting device includes a tapered surface provided in the peripheral circle of the magnetic flux concentrator. The tapered surface is vertical to the direction of the lines of magnetic flux of approximately 45 degrees, which connect the peripheral circle of the magnet and the peripheral circle of the magnetic flux concentrator.

Providing the tapered surface can make the flow direction of the lines of magnetic flux between the peripheral circle of the magnet and the peripheral circle of the magnetic flux concentrator parallel in a wide range.

Since the flow direction of magnetic flux is made parallel in the wide range, it is possible to extend a range in which the vector component of magnetic flux does not vary, even when there is a misalignment (assembly error) in the first and second magnetic sensors. Accordingly, it is possible to extend an assembly range in which precision in the detection of an angle is prevented from deteriorating.

In yet another aspect of the present invention, a rotation angle detecting device has two first magnetic sensors and two second magnetic sensors. The rotation angle detecting device averages the output of one of the first magnetic sensors the magnetically sensitive surface of which is oriented in the axial direction of the rotational axis, and the output of the other first magnetic sensor the magnetically sensitive surface of which is oriented in the radial direction of the rotational axis. The rotation angle detecting device also averages the output of one of the second magnetic sensors the magnetically sensitive surface of which is oriented in the axial direction of the rotational axis, and the output of the other second magnetic sensor the magnetically sensitive surface of which is oriented in the radial direction of the rotational axis. Thus, the outputs of the first and second magnetic sensors are stabilized, and precision in the output is increased. Accordingly, it is possible to increase precision in the detection of an angle.

The two first magnetic sensors may be mounted in a single chip, and the two second magnetic sensors may be mounted in another single chip. Therefore, it is possible to prevent the installability of the two first magnetic sensors and the two second magnetic sensors from deteriorating.

In still another aspect of the present invention, a rotation angle detecting device includes the magnet being a permanent magnet, which is polarized in such a manner that magnetic flux is oriented in the radial directions vertical to the rotational axis. In the permanent magnet, the polarized direction of the magnetic flux generation section is 180 degrees opposite to that of the magnetic flux absorption section. Ideally, the first and second magnetic sensors are disposed 90 degrees away from each other in the rotational direction. In a case where 90 degrees cannot be precisely secured, however, using a mathematical expression makes it possible to detect an angle in disposition of 10 to 170 degrees.

Accordingly, it is possible to take out outputs of a sine curve and a cosine curve from the first and second magnetic sensors at intervals of 360 degrees.

Other features and advantages of the present invention will be appreciated, as well as methods of operation and the function of the related parts from a study of the following detailed description, appended claims, and drawings, all of which form a part of this application. In the drawings:

DETAILED DESCRIPTION OF THE PREFERRED EMBODIMENTS

In a rotation angle detecting device according to a preferred embodiment, the rotation angle of a magnet provided in a rotary member is detected by magnetic flux passing through first and second magnetic sensors, to detect the rotation angle of the rotary member. The rotation angle detecting device comprises the magnet, a magnetic flux concentrator, a first magnetic sensor, and a second magnetic sensor. The magnet provided in the rotary member has the shape of a ring or a disc, and the center of the peripheral circle of the magnet is coaxial with a rotational axis. In the magnet, a magnetic flux generation section and a magnetic flux absorption section are oriented in radial directions vertical to the rotational axis. The magnetic flux concentrator rotating integrally with the magnet has the shape of a ring or a disc. The center of the peripheral circle of the magnetic flux concentrator is coaxial with the rotational axis, and the magnetic flux concentrator made of a magnetic material is disposed in parallel with the magnet. The first magnetic sensor provided in a fixed member is disposed between the peripheral circle of the magnet and the peripheral circle of the magnetic flux concentrator to detect variation in magnetism. The second magnetic sensor provided in the fixed member is disposed between the peripheral circle of the magnet and the peripheral circle of the magnetic flux concentrator at a predetermined angle away from the first magnetic sensor in a rotational direction, in order to detect variation in magnetism.

A first embodiment will now be described with reference to FIGS. 1A to 4B.

Figure 1A:
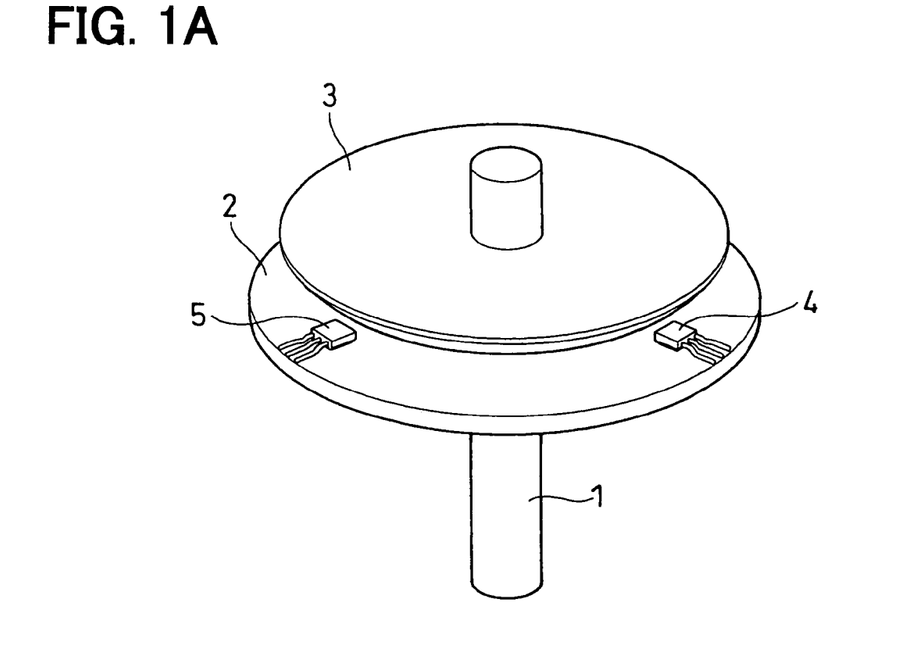
FIG. 1A is a perspective view of a rotation angle detecting device according to a first embodiment of the present invention.
Figure 1B:
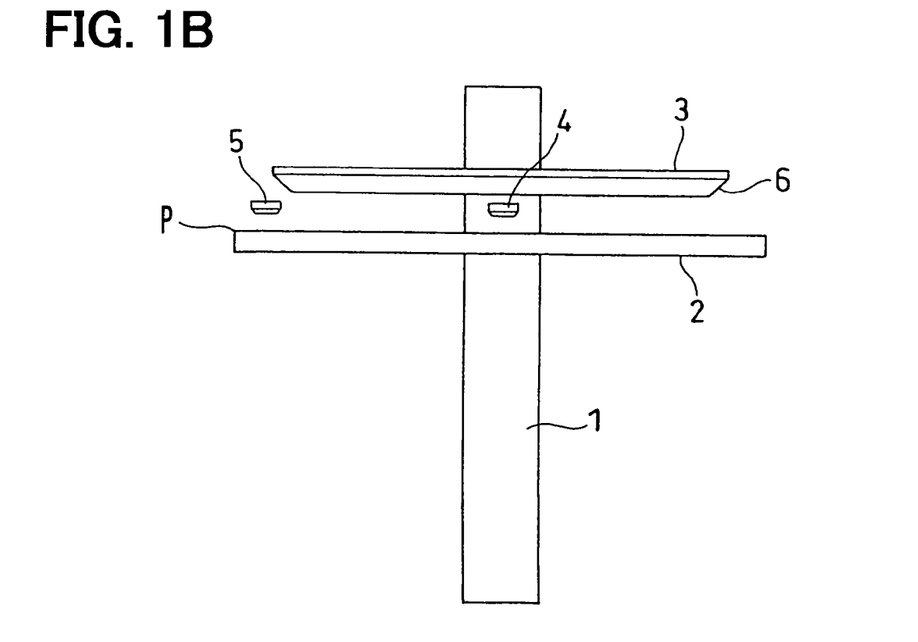
FIG. 1B is a side view of the rotation angle detecting device of FIG. 1A.

Referring to FIGS. 1A and 1B, the fundamental structure of a rotation angle detecting device will be first described. FIG. 1A is a schematic perspective view of the rotation angle detecting device, and FIG. 1B is a schematic side view thereof.

The rotation angle detecting device according to the first embodiment comprises a rotational axis 1, a magnet 2, a magnetic flux concentrator 3, and first and second magnetic sensors 4 and 5. The rotational axis 1 rotates integrally with a rotary member (for example, a throttle valve), the rotation angle of which is detected. The magnet 2 and the magnetic flux concentrator 3 rotate integrally with the rotational axis 1. The first and second magnetic sensors 4 and 5 are secured to a fixed member (for example, a substrate secured to a throttle housing).

The magnet 2 is a permanent magnet which is secured to the rotational axis 1 and rotates integrally with the rotational axis 1. The magnet 2 takes the shape of a ring or a disc, and has a constant thickness in the axial direction of the rotational axis 1. The center of the peripheral circle of the magnet 2 is coaxial with the rotational axis 1. In the magnet 2, a magnetic flux generation section (the S pole) and a magnetic flux absorption section (the N pole) are oriented in radial directions vertical to the rotational axis 1. To be more specific, the magnet 2 is polarized in the radial directions vertical to the rotational axis 1 so that the polarized direction of the magnetic flux generation section is 180 degrees opposite to that of the magnetic flux absorption section.

The magnetic flux concentrator 3, which is fixed to the rotational axis 1 and rotates integrally with the magnet 2, is made of a magnetic material such as iron. The magnetic flux concentrator 3 takes the shape of a ring or a disc, and has a constant thickness in the axial direction of the rotational axis 1. As in the case of the magnet 2, the center of the peripheral circle of the magnetic flux concentrator 3 is coaxial with the rotational axis 1. The magnetic flux concentrator 3 is disposed in parallel with the magnet 2 at a predetermined distance away.

Figure 2:
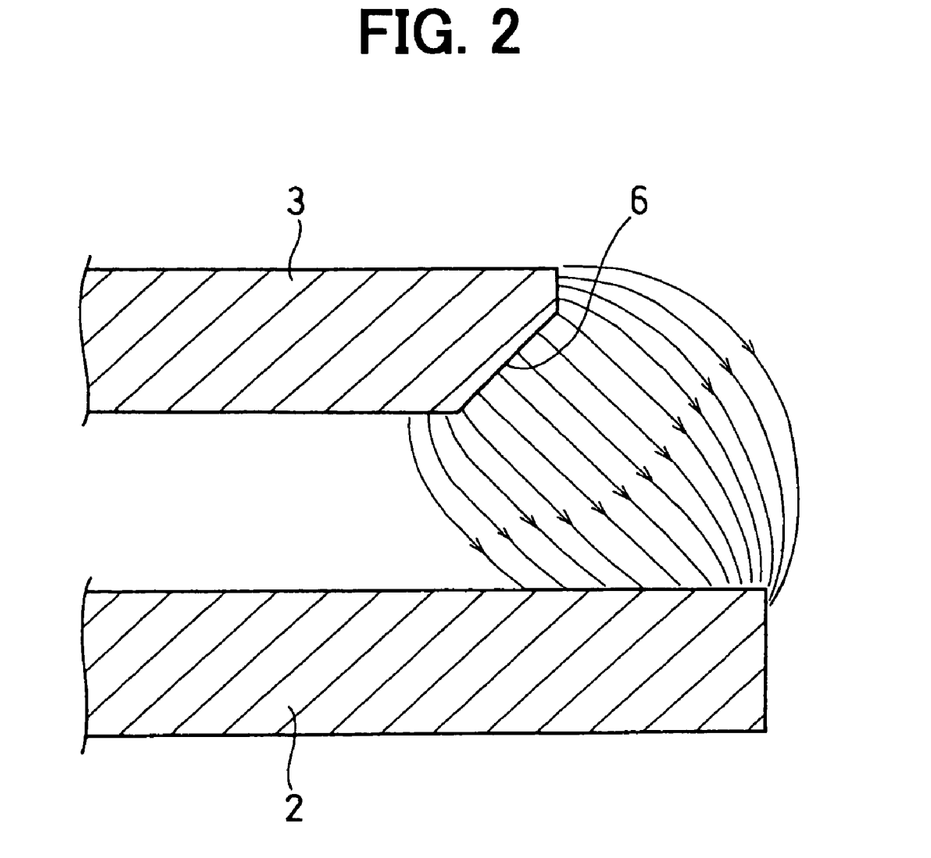
FIG. 2 is a partial cross-sectional view of a magnet and a magnetic flux concentrator of the rotation angle detection device of FIG. 1 showing the direction of lines of magnetic flux generated therebetween.

Referring to FIG. 2, the outer diameter of the magnetic flux concentrator 3 according to this embodiment is smaller than that of the magnet 2. A line connecting the outer edge of the magnet 2 and the outer edge of the magnetic flux concentrator 3 forms an angle of approximately 45 degrees with respect to the rotational axis 1.

To be more specific, a starting point P refers to a radial outer end of the magnet 2 and an axial end of the magnet 2 on the side of the magnetic flux concentrator 3, as shown in FIG. 1B. When 0 degree refers to the direction of the rotational axis heading for the magnetic flux concentrator 3 from the starting point P, and 90 degrees refer to the radial direction heading for the inside of the magnet 2 from the starting point P, the peripheral circle of the magnetic flux concentrator 3 is disposed in a position of approximately 45 degrees with respect to the starting point P.

Accordingly, the direction of lines of magnetic flux generated between the outer edge of the magnet 2 and the outer edge of the magnetic flux concentrator 3 forms an angle of approximately 45 degrees.

The first and second magnetic sensors 4 and 5 are also disposed in positions of approximately 45 degrees with respect to the starting point P.

As described above, the direction of the lines of magnetic flux generated between the outer edge of the magnet 2 and the outer edge of the magnetic flux concentrator 3 forms the angle of approximately 45 degrees, and the first and second magnetic sensors 4 and 5 are disposed in the positions of approximately 45 degrees with respect to the starting point P. Thus, it is possible to approximately equalize the sensitivity of magnetic detection, no matter how the magnetically sensitive surfaces of the first and second magnetic sensors 4 and 5 are oriented in the axial direction (0 degree or 180 degrees) of the rotational axis 1, or in the radial direction (90 degrees or 270 degrees) of the rotational axis 1. In other words, it is possible to select one direction to which the magnetically sensitive surfaces of the first and second magnetic sensors 4 and 5 are oriented from among the axial directions of the rotational axis 1 and the radial directions of the rotational axis 1. In the first embodiment, both of the magnetically sensitive surfaces of the first and second magnetic sensors 4 and 5 are oriented in the axial direction of the rotational axis 1.

As shown in FIG. 2, a tapered surface 6 (a chamfered section), which is vertical to the lines of magnetic flux of approximately 45 degrees connecting the peripheral circle of the magnet 2 and the peripheral circle of the magnetic flux concentrator 3, is formed in the whole periphery of the magnetic flux concentrator 3.

Providing the tapered surface 6 in the peripheral circle of the magnetic flux concentrator 3 can make the direction of the lines of magnetic flux between the peripheral circle of the magnet 2 and the peripheral circle of the magnetic flux concentrator 3 parallel in a wide range. Since the direction of the lines of magnetic flux of approximately 45 degrees is in parallel in the wide range, as described above, it is possible to extend a range in which the vector component of magnetic flux applied to the magnetically sensitive surfaces does not vary even when there is a misalignment (assembly error) in the first and second magnetic sensors 4 and 5. Accordingly, it is possible to extend an assembly range in which the precision in the detection of an angle is prevented from deteriorating.

The first magnetic sensor 4 is disposed between the peripheral circle of the magnet 2 and the peripheral circle of the magnetic flux concentrator 3 in such a manner that the magnetically sensitive surface is disposed in a range in which the lines of magnetic flux generated between the outer edge of the magnet 2 and the outer edge of the magnetic flux concentrator 3 forms an angle of approximately 45 degrees. The first magnetic sensor 4 generates an output in accordance with the flow direction and density of magnetic flux passing through the magnetically sensitive surface. The first magnetic sensor 4 has well known structure, in which a Hall element (sensor element) having the magnetically sensitive surface and an amplifier for amplifying the output of the Hall element are enclosed in a single chip. The amplifier may be disposed outside the chip (for example, on a substrate). As described above, the magnetically sensitive surface of the first magnetic sensor 4 according to the first embodiment is oriented in the axial direction of the rotational axis 1.

The second magnetic sensor 5 is disposed at a predetermined angle (a half of a difference between the polarized direction of the magnetic flux generation section and that of the magnetic flux absorption section: 90 degrees in this embodiment) away from the first magnetic sensor 4 in a rotational direction.

Furthermore, as in the case of the first magnetic sensor 4, the second magnetic sensor 5 is disposed between the peripheral circle of the magnet 2 and the peripheral circle of the magnetic flux concentrator 3 in such a manner that the magnetically sensitive surface is disposed in the range in which the lines of magnetic flux generated between the outer edge of the magnet 2 and the outer edge of the magnetic flux concentrator 3 forms the angle of approximately 45 degrees. The second magnetic sensor 5 generates an output in accordance with the flow direction and density of magnetic flux passing through the magnetically sensitive surface. The second magnetic sensor 5, as in the case of the foregoing first magnetic sensor 4, has well known structure, in which a Hall element (sensor element) having the magnetically sensitive surface and an amplifier for amplifying the output of the Hall element are enclosed in a single chip. The amplifier may be disposed outside the chip (for example, on the substrate). As described above, the magnetically sensitive surface of the second magnetic sensor 5 according to the first embodiment is oriented in the axial direction of the rotational axis 1.

In the rotation angle detecting device having the foregoing structure, the magnet 2 and the magnetic flux concentrator 3 rotate together with the rotational axis 1, when the rotational axis 1 rotates.

Figure 3A:
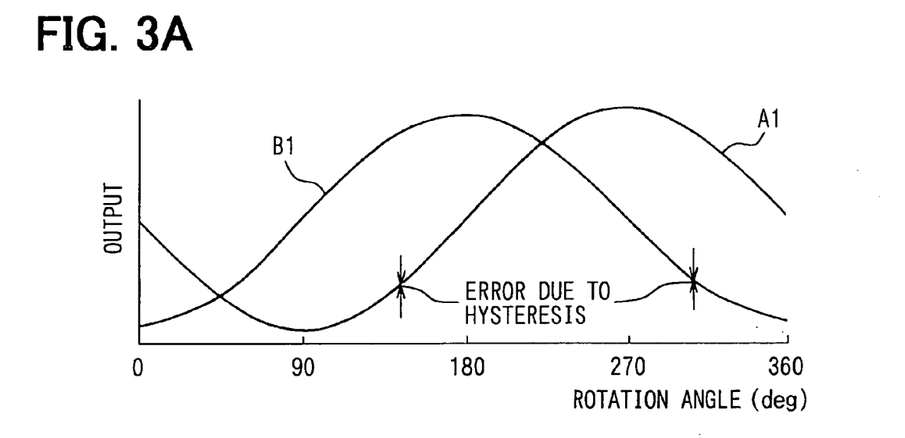
FIGS. 3A to 3C are graphs illustrating sensor output, inverse trigonometric functional operation, and connection, respectively, according to the first embodiment of the present invention.

Then, the flow direction and density of magnetic flux applied to the magnetically sensitive surfaces of the first and second magnetic sensors 4 and 5 vary with a period of 360 degrees. Thus, as shown in FIG. 3A, the first and second magnetic sensors 4 and 5 generate sine waveforms A1 and B1 with a phase difference of 90 degrees. In other words, when the output A1 of the first magnetic sensor 4 is in a sine curve, the output B1 of the second magnetic sensor 5 is in a cosine curve.

The rotation angle detecting device subjects the output A1 (output amplified by the amplifier) of the first magnetic sensor 4 to digital conversion, and inputs a converted signal into an angle calculation circuit such as a microcomputer (not shown). The rotation angle detecting device also subjects the output B1 (output amplified by the amplifier) of the second magnetic sensor 5 to digital conversion, and inputs a converted signal into the angle calculation circuit.

Figure 3B:
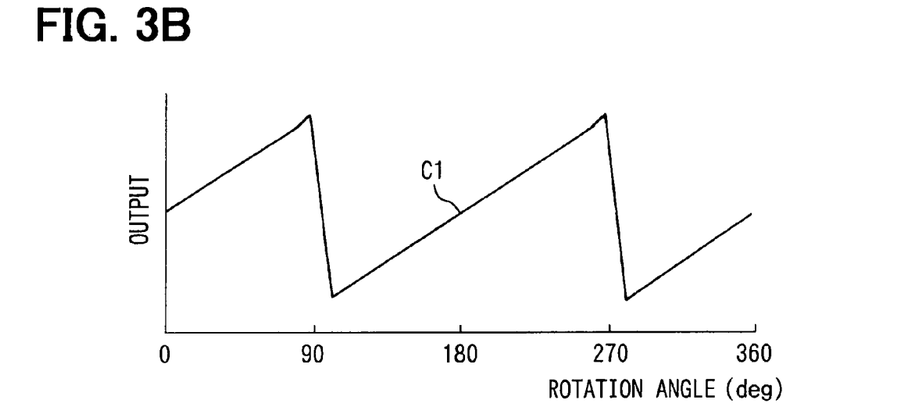
Figure 3C:
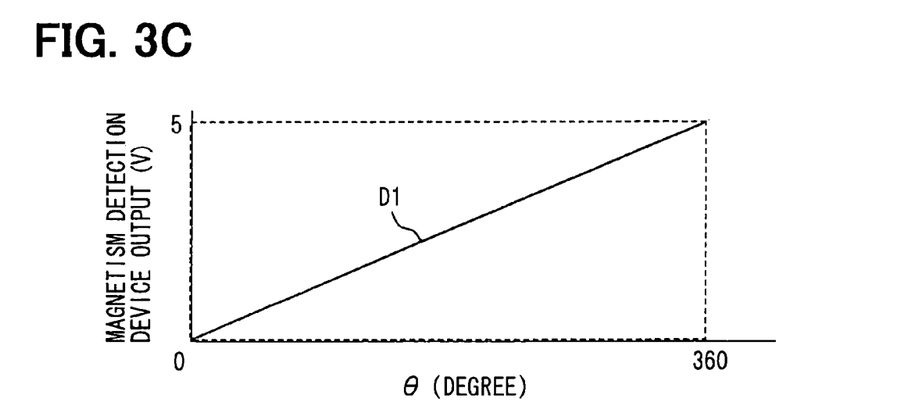
Figure 4A:
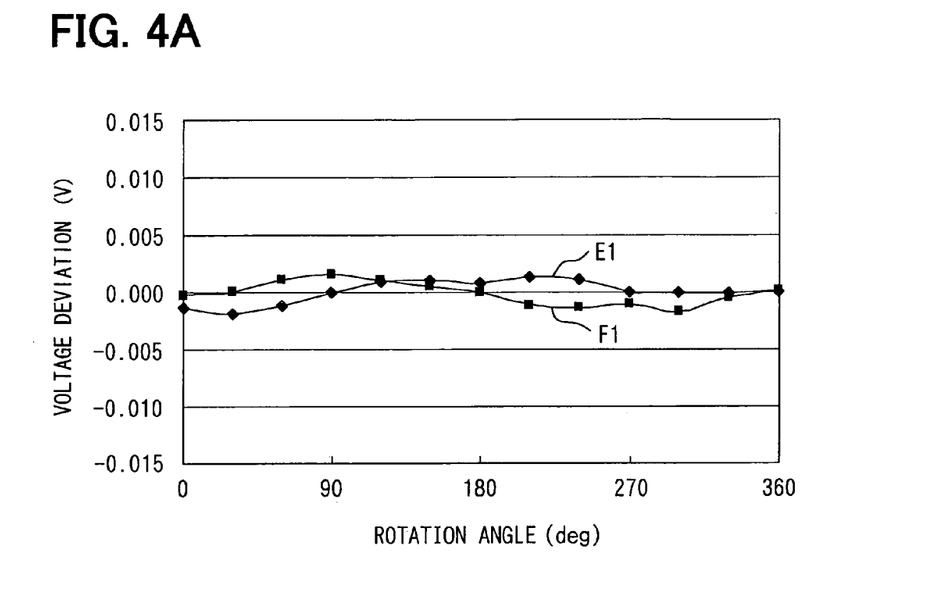
FIG. 4A is a graph of voltage deviation amounts in the output of first and second magnetic sensors in a first half and a latter half of rotation according to the first embodiment of the present invention.
Figure 4B:
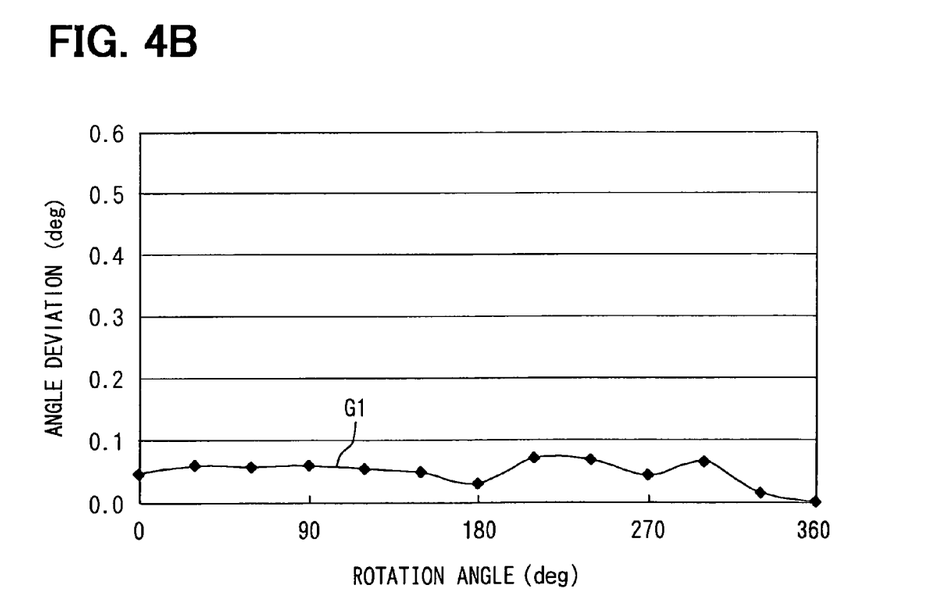
FIG. 4B is a graph of deviation amount in a detected angle according to the first embodiment of the present invention.

The angle calculation circuit carries out angle calculation from the outputs A1 and B1 of the first and second magnetic sensors 4 and 5. The angle calculation circuit converts the sine curve output A1 of the first magnetic sensor 4 and the cosine curve output B1 of the second magnetic sensor 5 into upward-sloping linear characteristics C1 at an interval of 180 degrees by an inverse trigonometric functional operation $\{\tan \theta = \sin \theta / \cos \theta \rightarrow \theta = \tan^{-1}(\sin \theta / \cos \theta)\}$, as shown in FIG. 3B. After that, the angle calculation circuit connects each of the upward-sloping linear characteristics C1 to one another, in order to generate a rotation angle output D1 (analog signal) corresponding to the rotation of 0 degree to 360 degrees of the magnet 2, as shown in FIG. 3C.

In the rotation angle detecting device adopting the foregoing structure, the magnetic flux concentrator 3 is disposed in parallel with the magnet 2, and the first and second magnetic sensors 4 and 5 are disposed between the peripheral circle of the magnet 2 and the peripheral circle of the magnetic flux concentrator 3. Thus, the magnetic flux concentrator 3 regulates the lines of magnetic flux applied from the magnet 2 to the first and second magnetic sensors 4 and 5. Accordingly, if there is a slight misalignment in the first and second magnetic sensors 4 and 5, the vector components of magnetic flux applied to the magnetically sensitive surfaces of the first and second magnetic sensors 4 and 5 are prevented from varying. Therefore, if there is a misalignment in the first and second magnetic sensors 4 and 5, it is possible to prevent precision in the detection of an angle from deteriorating.

Since the magnet 2 and the magnetic flux concentrator 3 integrally rotate, hysteresis does not occur in the output characteristics of the first and second magnetic sensors 4 and 5 in the first and latter halves of the rotation (the forward rotation and the reverse rotation) of the magnet 2. Accordingly, as shown by a solid line E1 (an output deviation amount in the first and latter halves of the first magnetic sensor 4) and a solid line F1 (an output deviation amount in the first and latter halves of the second magnetic sensor 5) of FIG. 4A, deviation does not occur in the voltage outputs of the first and second magnetic sensors 4 and 5 in the first and latter halves of the rotation. Since deviation does not occur in the voltage outputs of the first and second magnetic sensors 4 and 5 in the first and latter halves of the rotation, as described above, it is possible to restrain deviation in the detection of an angle to an extremely small amount, as shown by a solid line G1 (a deviation amount in a rotation angle) of FIG. 4B. In other words, the magnet 2 and the magnetic flux concentrator 3 integrally rotate, so that it is possible to eliminate deterioration in precision in the detection of an angle due to hysteresis.

Figure 5A:
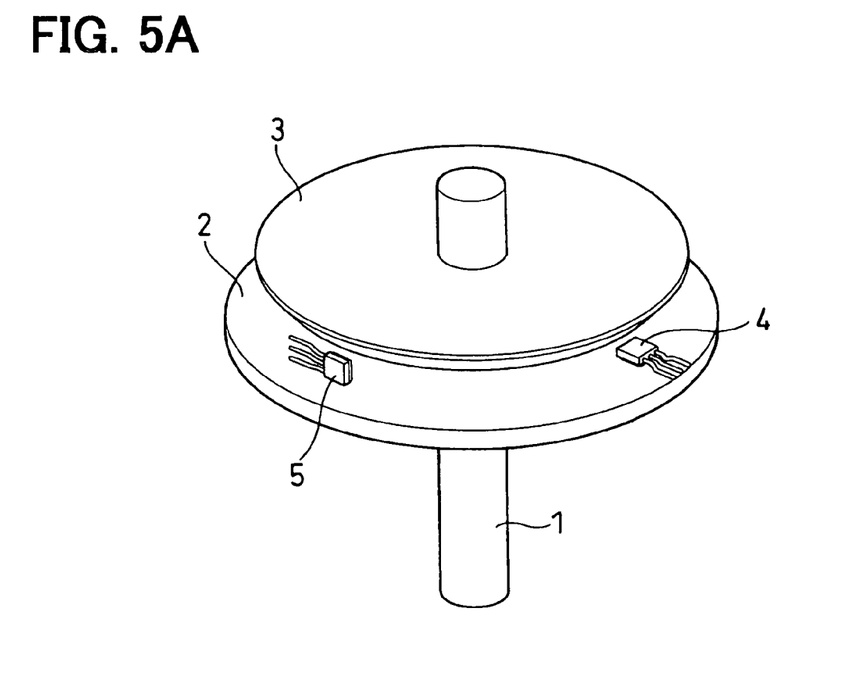
FIG. 5A is a perspective view of a rotation angle detecting device according to a second embodiment of the present invention.
Figure 5B:
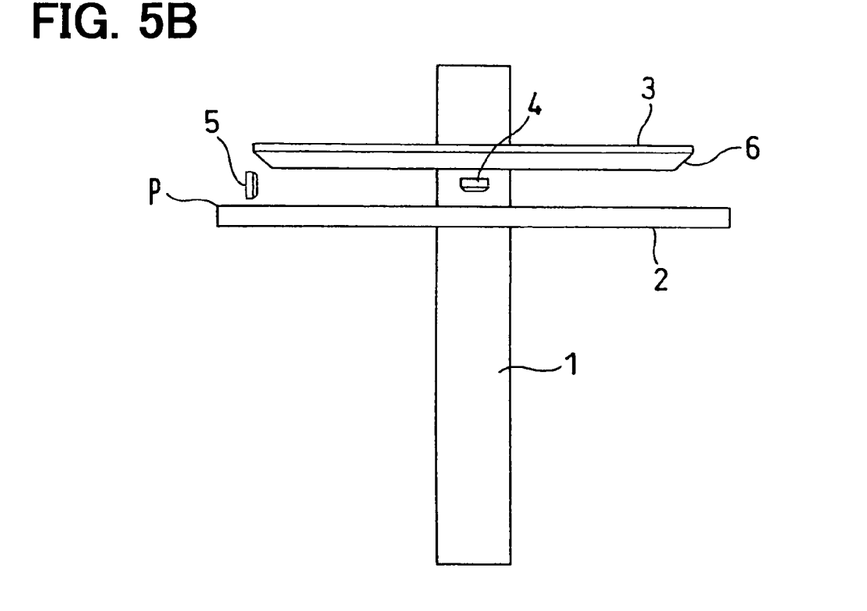
FIG. 5B is a side view of the rotation angle detecting device of FIG. 5A.

A second embodiment will now be described with reference to FIG. 5. In the following embodiment, only differences from the first embodiment will be described, and the same reference numbers as the first embodiment refer to objects having the same function.

As described in the foregoing first embodiment, the direction of the lines of magnetic flux generated between the outer edge of the magnet 2 and the outer edge of the magnetic flux concentrator 3 forms an angle of approximately 45 degrees. Thus, when the first and second magnetic sensors 4 and 5 are disposed in positions of approximately 45 degrees with respect to the starting point P, it is possible to approximately equalize the sensitivity of magnetic detection, no matter how the magnetically sensitive surfaces of the first and second magnetic sensors 4 and 5 are oriented in the axial direction (0 degree or 180 degrees) of the rotational axis 1, or in the radial direction (90 degrees or 270 degrees) of the rotational axis 1. In other words, it is possible to select one direction to which each of the magnetically sensitive surfaces of the first and second magnetic sensors 4 and 5 is oriented from among the axial directions of the rotational axis 1 and the radial directions of the rotational axis 1.

In the second embodiment, the magnetically sensitive surface of the first magnetic sensor 4 is oriented in the radial direction of the rotational axis 1, and the magnetically sensitive surface of the second magnetic sensor 5 is oriented in the axial direction of the rotational axis 1. Alternatively, the magnetically sensitive surface of the first magnetic sensor 4 may be oriented in the axial direction of the rotational axis 1, and the magnetically sensitive surface of the second magnetic sensor 5 may be oriented in the radial direction of the rotational axis 1. Contrary to the foregoing first embodiment, the magnetically sensitive surfaces of both of the first and second magnetic sensors 4 and 5 may be oriented in the radial direction of the rotational axis 1.

The direction of the lines of magnetic flux generated between the outer edge of the magnet 2 and the outer edge of the magnetic flux concentrator 3 forms the angle of approximately 45 degrees, and the first and second magnetic sensors 4 and 5 are disposed in the positions of approximately 45 degrees with respect to the starting point P. Thus, it is possible to select one direction to which each of the magnetically sensitive surfaces of the first and second magnetic sensors 4 and 5 is oriented from among the axial directions of the rotational axis 1 and the radial directions of the rotational axis 1. Therefore, when the first and second magnetic sensors 4 and 5 are limited in terms of installability, it is possible to select the installation orientation of each of the first and second magnetic sensors 4 and 5, and hence the installability of the first and second magnetic sensors 4 and 5 is increased.

Figure 6A:
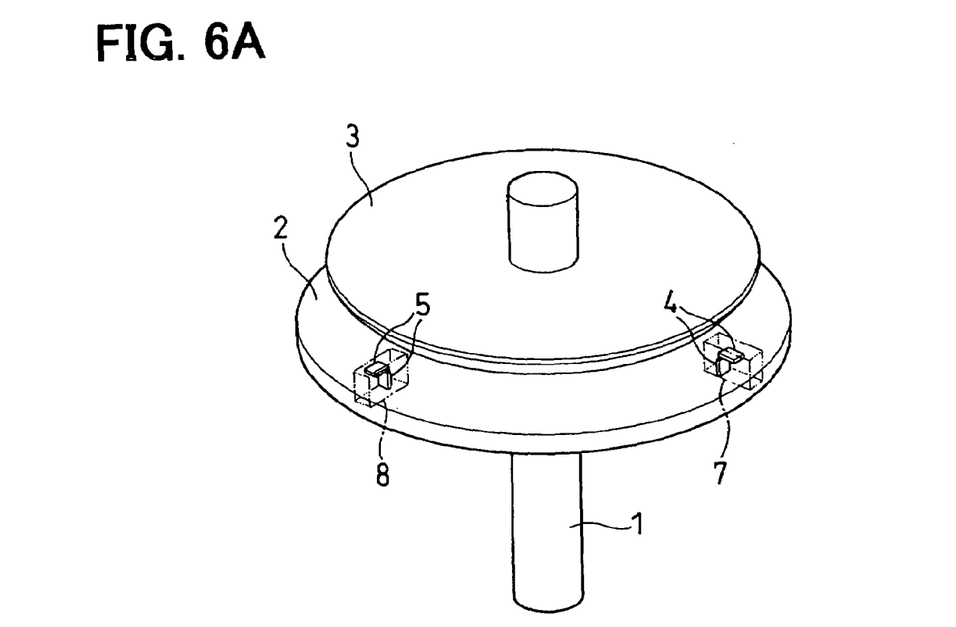
FIG. 6A is a perspective view of a rotation angle detecting device according to a third embodiment of the present invention.
Figure 6B:
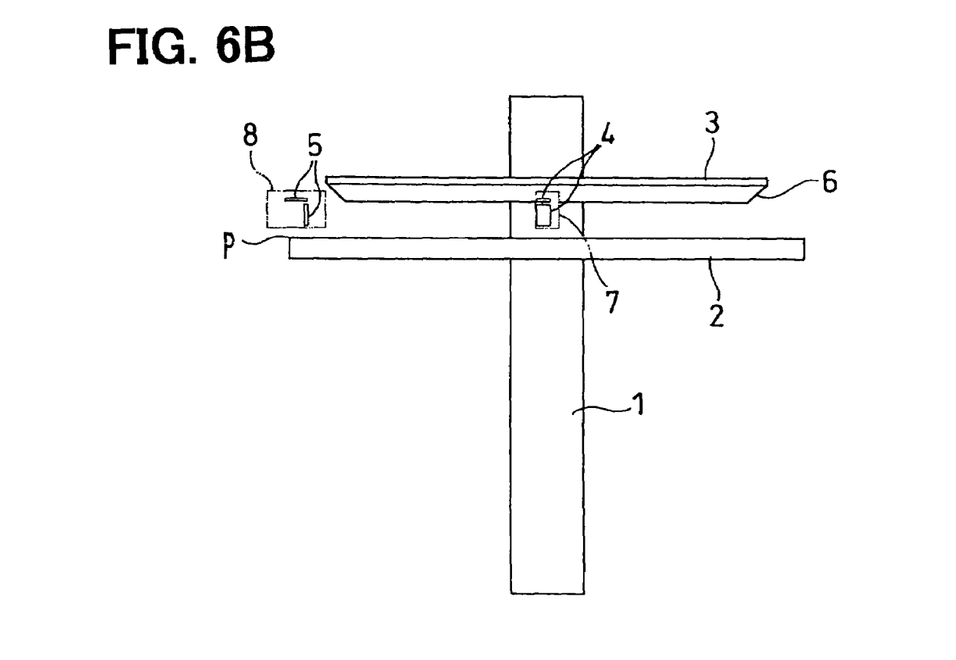
FIG. 6B is a side view of the rotation angle detecting device of FIG. 6A.

A third embodiment will now be described with reference to FIG. 6.

A first chip 7, in which two first magnetic sensors 4 are enclosed, is disposed in a position in which the first magnetic sensor 4 according to the foregoing first embodiment is disposed. One of the first magnetic sensors 4 has the magnetically sensitive surface which is oriented in the axial direction of the rotational axis 1, and the other of the first magnetic sensors 4 has the magnetically sensitive surface which is oriented in one of the radial directions of the rotational axis 1. The outputs of the two first magnetic sensors 4 are averaged to be used in angle calculation.

A second chip 8, in which two second magnetic sensors 5 are enclosed, is disposed in a position in which the second magnetic sensor 5 according to the foregoing first embodiment is disposed. One of the second magnetic sensors 5 has the magnetically sensitive surface which is oriented in the axial direction of the rotational axis 1, and the other of the second magnetic sensors 5 has the magnetically sensitive surface which is oriented in one of the radial directions of the rotational axis 1. The outputs of the two second magnetic sensors 5 are averaged to be used in angle calculation.

The output from the first magnetic sensor 4 the magnetically sensitive surface of which is oriented in the axial direction of the rotational axis 1, and the output from the first magnetic sensor 4 the magnetically sensitive surface of which is oriented in the radial direction of the rotational axis 1 are averaged. Also, the output from the second magnetic sensor 5 the magnetically sensitive surface of which is oriented in the axial direction of the rotational axis 1, and the output from the second magnetic sensor 5 the magnetically sensitive surface of which is oriented in the radial direction of the rotational axis 1 are averaged. Thus, the outputs of the first and second magnetic sensors 4 and 5 are stabilized, and precision in the outputs of the first and second magnetic sensors 4 and 5 is increased. As a result, it is possible to increase precision in the detection of an angle.

The two first magnetic sensors 4 are mounted in the single first chip 7, and the two second magnetic sensors 5 are mounted in the single second chip 8. Accordingly, it is possible to prevent the installability of the two first magnetic sensors 4 and the two second magnetic sensors 5 from deteriorating.

In the foregoing embodiments, the outer diameter of the magnetic flux concentrator 3 is smaller than that of the magnet 2. The outer diameter of the magnetic flux concentrator 3 may be the approximately same as that of the magnet 2. Otherwise, the outer diameter of the magnetic flux concentrator 3 may be larger than that of the magnet 2.

When the outer diameter of the magnetic flux concentrator 3 is larger than that of the magnet 2, a tapered surface 6 (a chamfered section) may be provided in the peripheral circle of the magnet 2, in order to make lines of magnetic flux generated between the outer edge of the magnet 2 and the outer edge of the magnetic flux concentrator 3 parallel in a wide range.

In the foregoing embodiments, the magnetic flux generation section (the S pole) and the magnetic flux absorption section (the N pole) are 180 degrees opposite to each other. However, a plurality of magnetic flux generation sections (the S poles) and a plurality of magnetic flux absorption sections (the N poles) may be provided in the magnet 2. In other words, the S poles and the N poles may be alternate at intervals of, for example, 90 degrees. The second magnetic sensor 5 is disposed at a half of difference between the polarized direction of the magnetic flux generation section and that of the magnetic flux absorption section away from the first magnetic sensor 4 in the rotational direction. Accordingly, when the S poles and the N poles are alternate at intervals of 90 degrees, the second magnetic sensor 5 is disposed 45 degrees away from the first magnetic sensor 4 in the rotational direction.

In the foregoing embodiments, the magnet is composed of the permanent magnet. However, an electromagnet, which generates magnetic force by energization, may be used instead.

In the foregoing embodiments, as a concrete embodiment of the rotation angle detecting device, the degree of opening of the throttle valve is detected. Another rotation angle such as the rotation angle of an arm section of an industrial robot, however, may be detected instead.

Figure 10:
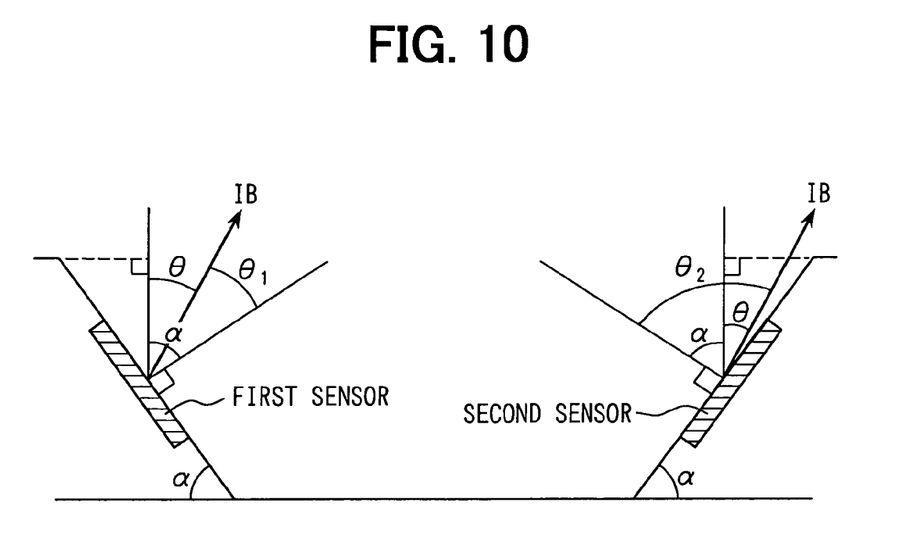
FIG. 10 is a supplemental explanatory view of the detection of an angle, when the first and second magnetic sensors are disposed in a rotational direction.

Furthermore, it should be appreciated that while the first and second magnet sensors of the above-described embodiment have been disclosed as being generally 90 degrees apart in the rotational direction, a further alternative embodiment might include the sensors disposed at an angle other than 90 degrees apart. For example, with reference to FIG. 10 and the following mathematical expressions, it is possible to accurately detect the rotational angle when the sensors are disposed anywhere within 10 and 170 degrees apart. Assuming that the sensors form an angle of $180-2\alpha$, the following calculations are used to calculate the angle:

$$VH_1 = V_0 \cos(\theta_1) = V_0 \cos(\alpha-\theta) \qquad (1)$$

$$VH_2 = V_0 \cos(\theta_2) = V_0 \cos(\alpha-\theta) \qquad (2)$$

Therefore, calculating (1)+(2) and (1)−(2) reveals:

$$VH_1 + VH_2 = 2V_0 \cos(\alpha)\cos(\theta) \qquad (3)$$

$$VH_1 - VH_2 = 2V_0 \sin(\alpha)\sin(\theta) \qquad (4)$$

Finally, the angle $\theta$ is determined from the arbitrary angle $\alpha$ from the following:

$$\sin(\theta)/\cos(\theta) = \tan(\theta) = \cot(\alpha)(VH_1-VH_2)(VH_1+VH_2).$$

What is claimed is:

1. A rotation angle detecting device comprising:
a magnet provided in a rotary member, the magnet having a shape of one of a ring and a disc, a center of a peripheral circle of the magnet being substantially coaxially aligned with a rotational axis of the rotary member, the magnet having a magnetic flux generation section and a magnetic flux absorption section that are oriented in radial directions vertical to the rotational axis;
a magnetic flux concentrator made of a magnetic material, the magnetic flux concentrator rotating integrally with the magnet, the magnetic flux concentrator having a shape of one of a ring and a disc, a center of a peripheral circle of the magnetic flux concentrator being substantially coaxially aligned with the rotational axis, the magnetic flux concentrator being disposed substantially parallel to the magnet;
a first magnetic sensor provided on a fixed member, the first magnetic sensor being disposed between the peripheral circle of the magnet and the peripheral circle of the magnetic flux concentrator to detect variation in magnetism; and
a second magnetic sensor provided on the fixed member, the second magnetic sensor being disposed between the peripheral circle of the magnet and the peripheral circle of the magnetic flux concentrator at a predetermined angle away from the first magnetic sensor in a rotational direction in order to detect variation in magnetism, wherein
the rotation angle detecting device detects the rotation angle of the rotary member with respect to the fixed member by magnetic flux passing through the first and second magnetic sensors.

2. The rotation angle detecting device according to claim 1, wherein
when a starting point identifies a radial outer end of the magnet and an axial end of the magnet on a side of the magnetic flux concentrator, and when 0 degrees identifies a direction of the rotational axis heading for the magnetic flux concentrator from the starting point, and 90 degrees identifies a radial direction heading for an inside of the magnet from the starting point,
the peripheral circle of the magnetic flux concentrator is disposed in a position of approximately 45 degrees with respect to the starting point, and
the first and second magnetic sensors are also disposed in positions of approximately 45 degrees with respect to the starting point.

3. The rotation angle detecting device according to claim 2, wherein
a tapered surface is provided on the peripheral circle of the magnetic flux concentrator, the tapered surface being vertical to a direction of the lines of magnetic flux of approximately 45 degrees, which connect the peripheral circle of the magnet and the peripheral circle of the magnetic flux concentrator.

4. The rotation angle detecting device according to claim 1, wherein
the first magnetic sensor includes two first magnetic sensors mounted in a first chip; and
the second magnetic sensor includes two second magnetic sensors mounted in a second chip, wherein
one of the first magnetic sensors has a magnetically sensitive surface oriented in the axial direction of the rotational axis, the other of the first magnetic sensors has a magnetically sensitive surface oriented in the radial direction of the rotational axis, and both outputs of the first magnetic sensors are averaged, and
one of the second magnetic sensors has a magnetically sensitive surface oriented in the axial direction of the rotational axis, the other of the second magnetic sensors has a magnetically sensitive surface oriented in the radial direction of the rotational axis, and both outputs of the second magnetic sensors are averaged.

5. The rotation angle detecting device according to claim 1, wherein
the magnet is a permanent magnet that is polarized in such a manner that magnetic flux is oriented in the radial directions vertical to the rotational axis and that the polarized direction of the magnetic flux generation section is 180 degrees opposite to that of the magnetic flux absorption section, and
the first and second magnetic sensors are disposed 10 to 170 degrees away from each other in the rotational direction.

* * * * *